Patented Aug. 10, 1954

2,686,179

UNITED STATES PATENT OFFICE 2,686,179

AZO-DYESTUFFS

Raymond Gunst, Basel, Switzerland, assignor to Ciba Limited, Basel, Switzerland, a Swiss firm No Drawing. Application August 21, 1950, Serial No. 180,697

Claims priority, application Switzerland August 25, 1949

1 Claim. (Cl. 260—158)

This invention is based on the observation that new valuable azo-dyestuffs are obtained when diazo compounds are coupled in an alkaline medium with compounds of the general formula

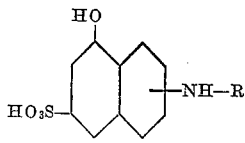

in which the radical -NH-R is situated in a β-position of the 6-membered ring of the naphthalene nucleus which does not contain the hydroxyl and sulfonic acid group and R indicates a 2-phenylbenzthiazole radical of which the phenyl radical is attached to the -NH- group.

As diazo compounds in the present process there can be used such of any aromatic amines and among others also diazo-azo-compounds.

Especially valuable dyestuffs are obtained in general from diazo compounds of such amines as contain metal complex-forming groups, for example o-hydroxy-carboxy-groups and especially from such amines as contain, in adjacent position to the diazotizable amino group, a group which is capable of taking part in the formation of complex metal compounds, as for example a hydroxyl group, a methoxy group or a carboxyl group. These amines may belong for example to the naphthalene or to the benzene series. Amino azo-dyestuffs may also be employed. If desired these amines can contain at the same time a metal complex-forming group in adjacent position to the amino group and an o-hydroxy-carboxy group.

As examples of aromatic amines of which the diazo compounds can be used as starting materials according to the present process, the following compounds may be mentioned: The diazo-azo compound from 1 mol of tetrazotized 4:4-diaminodiphenyl and 1 mol of salicylic acid, 2-amino-1-hydroxybenzene-4-sulfonic acid and its nuclear substitution products as for example 6-chloro - 2 - amino - 1 - hydroxybenzene - 4 - sulfonic acid, 2-amino-1-hydroxybenzene-4-sulfonic acid amide, 2-amino-1-hydroxy-4-, or -5-nitrobenzene, 2-amino-1-hydroxybenzene-4-carboxylic acid anilide, 1-amino-2-hydroxynaphthalene-4-sulfonic acid and its nuclear substitution products, 2-amino-1-methoxybenzene, 4-nitro-2-amino-1-methoxybenzene, 2-amino-1-methoxybenzene-4-sulfonic acid, 2-amino-1-methoxybenzene-4-sulfonic acid amide, 3-methoxy-4-amino-1:1'-azobenzene-3'-sulfonic acid, 2-aminobenzene-1-carboxylic acid and its nuclear substitution products as for example 5-nitro-2-aminobenzene-1-carboxylic acid, 4-ethoxy-2-aminobenzene-1-carboxylic acid, 4-amino-4'-hydroxy-1:1'-azobenzene-3'-carboxylic acid, 4-amino-2:5-dimethoxy-4'- hydroxy-1:1'- azobenzene-3'- carboxylic acid, 4-amino-4'-hydroxy-1:1'-azobenzene-3:3'-dicarboxylic acid, 5-methyl-4-amino-4' - hydroxy - 1:1' - azobenzene - 3:3' - dicarboxylic acid and the aminoazo-dyestuff which is obtained by coupling of diazotized 2-aminonaphthalene-4:8-disulfonic acid or 1-amino-8-hydroxynaphthalene-3:6-disulfonic acid with 1-amino-2-methoxy-5-methylbenzene.

The 1-hydroxynaphthalene-3-sulfonic acids of the formula given above which likewise serve as starting materials in the present process, contain in a β-position of the 6-membered ring of the naphthalene nucleus which does not contain the hydroxy and sulfonic acid group, that is to say in the 6- or preferably the 7-position, the radical -NH-R, in which R indicates a 2-phenylbenzthiazole radical of which the phenyl radical is attached to the -NH- group. The 2-phenylbenzthiazole radical is preferably attached in the 4'-position of the phenyl radical to the -NH-group. It may be free from further substituents or contain substituents which may be situated in the phenyl radical and/or in the benzene nucleus condensed with the thiazole ring. As substituents there may be mentioned chiefly methyl groups and sulfonic acid groups.

On account of their good accessibility those compounds of the formula mentioned above are principally of value, in which the radical R indicates the radical of a 2-(4'-aminophenyl)-6-methylbenzthiazole, which may if desired contain in addition one or two sulfonic acid groups and/or in the phenyl radical a methyl group and in the condensed benzene ring a further methyl group.

The compounds employed as coupling components in the present process may be obtained according to methods known per se from the amino-hydroxynaphthalene or dihydroxynaphthalene monosulfonic acids of the formula

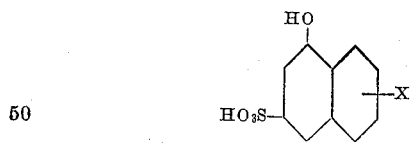

in which X indicates an -NH₂- group or preferably an -OH- group, which is situated in a β-position of the 6-membered ring of the naphthalene nucleus which does not contain the sulfonic acid group, and aminophenylbenzthiazoles by reaction with sulfites.

The following aminophenylbenzthiazoles may for example be reacted according to this method with the dihydroxynaphthalene monosulfonic acids: 2 - (4' - amino) - phenyl - 6 - methyl - benzthiazole, 2 - (4' - amino) - phenyl - 6 - methyl - benzthiazole - monosulfonic acids such for example, as 2 - (4' - amino) - phenyl - 6 - methyl - benzthiazole - X - sulfonic acid, obtainable by sulfonating 2 - (4' - amino) - phenyl - 6 - methyl - benzthiazole in concentrated sulfuric acid, 2 - (4' - amino) - phenyl - 6 - methyl - benzthiazole - X:X' - disulfonic acid, 2 - (3' - amino) - phenyl - benzthiazole - X - sulfonic acid. The last mentioned compound can be prepared by acylating 2 - amino - 1 mercaptobenzene with 3 - nitro - benzoylchloride, ring closure (splitting off water with hydrochloric acid), sulfonating the nitro compound, and reducing the nitro group to an amino group.

As examples of coupling components which correspond to the above defined composition and can be employed as starting materials in the present process there may be mentioned in detail:

The 2 - [4' - (8'' - hydroxynaphthyl - [2''] - aminophenyl)] - 6 - methylbenzthiazole - 6'' - sulfonic acid of the formula

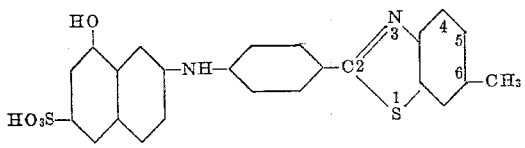

The 2 - [4' - (5'' - hydroxynaphthyl - [2''] - aminophenyl)] - 6 - methylbenzthiazole - 7'' - sulfonic acid of the formula

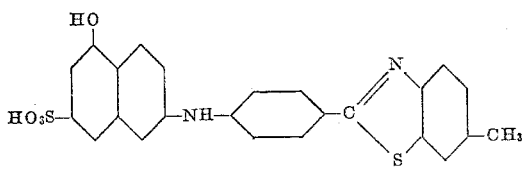

The 2 - [4' - (8'' - hydroxynaphthyl - [2''] - aminophenyl)] - 6 - methylbenzthiazole - X:6'' - disulfonic acid of the formula

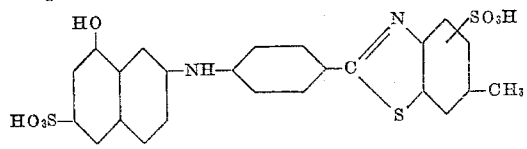

The 2 - [4' - (5'' - hydroxynaphthyl - [2''] - aminophenyl)] - 6 - methylbenzthiazole - X:7'' - disulfonic acid of the formula

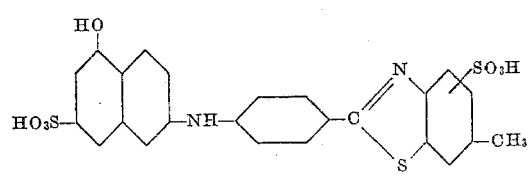

The 2 - [3' - methyl - 4' - (8'' - hydroxynaphthyl - [2''] - aminophenyl)] - 4:6 - dimethyl - benzthiazole - 6'' - sulfonic acid of the formula

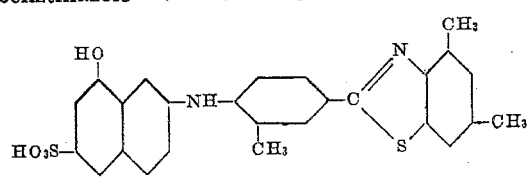

The 2 - [4' - (8'' - hydroxynaphthyl - [2''] - aminophenyl)] - 6 - methyl - benzthiazole - X:X':6'' - trisulfonic acid of the formula

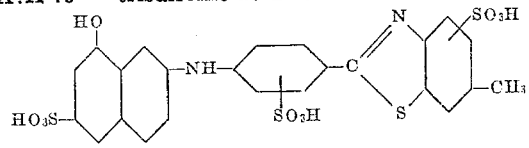

The 2 - [3' - (5'' - hydroxynaphthyl - [2''] - aminophenyl)] - benzthiazole - X:7'' - disulfonic acid of the formula

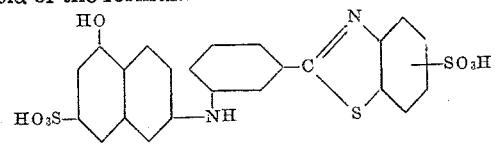

The 2 - [3' - (8'' - hydroxynaphthyl - [2''] - aminophenyl)] - benzthiazole - X:6'' - disulfonic acid

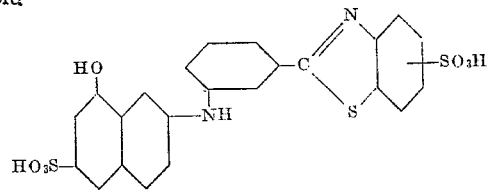

In the present process the coupling takes place in an alkaline medium, for example in the range of alkalinity from alkali carbonate to alkali hydroxide or alkaline earth hydroxide.

According to a further feature of the present invention when the dyestuffs thus obtainable contain in the radical of the diazo component a substituent convertible into an NH$_2$- group, such as a nitro- or acyl-amino-group, then according to methods known per se two molecules of such a dyestuff or one molecule of such a dyestuff and one molecule of another azo-dyestuff likewise containing such a substituent, may be linked together at the mentioned nitrogen-containing substituents. This linkage of two dyestuff molecules may be effected for example by treatment of dyestuffs containing nitro-groups with glucose in alkali hydroxide solution, whereby as is known, two nitro groups are converted into one azoxy or azo linkage. If the nitro or acylamino group is first converted by reduction (for example by means of an alkali sulfide) or by hydrolysis (for example by heating in alkali hydroxide solution) into the -NH$_2$- group, then the linking up of two dyestuff molecules may be carried out by means of phosgene or a heterocyclic compound containing at least two reactive halogen atoms such as cyanuric chloride or dichloroquinazoline. These last mentioned reactions including the conversion of the aminoazo-dyestuffs into the urea derivatives by means of phosgene can, as above indicated, also be carried out with the aid of another aminoazo-dyestuff, as for example 1-amino-4'-hydroxy - 1:1' - azobenzene - 3' - carboxylic acid, whereby unsymmetrically constituted products are obtained.

All the dyestuffs obtainable according to the present invention are new. They correspond to the general formula

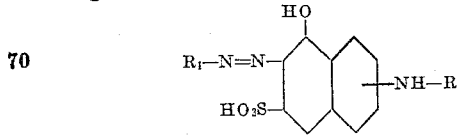

in which the radical -NH-R is situated in a β-position of the naphthalene nucleus, R indicates a 2-phenylbenzthiazole radical, of which the phenyl radical is attached, especially in 4'-position thereof, to the NH- group, and $R_1$ is a radical derived from a diazo component which may contain azo groups and/or may contain a metal complex-forming group for example in adjacent position to the diazotizable amino group a group which is capable of taking part in the formation of complex metal compounds.

The products of this invention include azo dyestuffs of the general formula

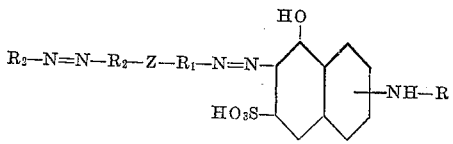

in which the radical -NH-R is situated in a β-position of the naphthalene nucleus, R indicates a 2-phenylbenzthiazole radical of which the phenyl radical is attached to the -NH- group, $R_1$ is the radical of a diazo component, one of the symbols $R_2$ the radical of a diazo component and the other the radical of an azo component and Z is a nitrogen-containing bridge member, preferably an azoxy or azo linkage, an -NH-CO-HN- group or a cyanuric radical with at least two carbon atoms each attached to an -NH- group.

On account of their good dyeing capacity the dyestuffs obtainable according to the present invention are especially valuable for the dyeing of cellulosic fibers as for example linen, cotton, artificial silk or staple fiber from regenerated cellulose.

Those dyestuffs which contain metal complex-forming groups in the molecule may be treated in substance, in the dyebath or on the fiber with agents providing metal, especially copper. The treatment with the agents providing metal may be carried out in the customary manner known per se.

Treatment with agents providing metal, for example, copper, in substance, may be of advantage when the complex metal compounds possess sufficient solubility for application in the dyebath. It can be carried out in an alkaline, neutral or acid medium, with or without the use of additions which promote complex formation or increase solubility. When the dyestuffs contain o-hydroxy-o'-methoxyazo groupings, the metallization in substance takes place with advantage under such conditions that the methyl groups present in these groupings are split off with formation of the metal complex of the corresponding o:o'-dihydroxyazo compound. Such metallizations are in many cases advantageously carried out in the presence of an ethanolamine, for example according to the process described in U. S. patent application Serial No. 778,734, filed October 8, 1947, by Riat et al., U. S. Patent No. 2,536,957.

Also when the solubility is sufficient, but especially when the dyestuffs do not contain sufficient solubilizing groups, so that their complex metal compounds are less suitable for dyeing, the treatment can be carried out with agents providing metal, especially copper, with advantage on the fiber or in one bath partly in the dyebath and partly on the fiber, as is described for example in French Patent No. 809,893. In many cases also very valuable dyeings are obtained by working according to the process in which the dyeings produced with the metal-free dyestuffs are after-treated with such aqueous solutions as contain on the one hand basic formaldehyde condensation products from compounds containing in the molecule at least once the atom grouping

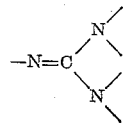

or, as in the case for example of cyanamide, are easily capable of conversion into such compounds, and on the other hand water-soluble metal compounds, especially complex copper compounds.

The dyeings obtainable with the new dyestuffs on cellulosic fibers are as a rule distinguished by good fastness to washing and primarily by very good fastness to light.

The following examples illustrate the invention, the parts and percentages being by weight unless otherwise stated and the relation between parts by weight and parts by volume being the same as that between the kilogram and the liter:

*Example 1*

18.8 parts of 2-amino-1-hydroxybenzene-4-sulfonic acid amide are dissolved in 200 parts of water with the addition of 10 parts by volume of 30 per cent. sodium hydroxide solution. The whole is cooled to 0° C. by introduction of ice, 6.9 parts of sodium nitrite are added in the form of a 4N-solution and 30 parts by volume of 30 per cent. hydrochloric acid introduced rapidly at a temperature of 0-5° C. After 30 minutes the diazotization is complete and the diazo compound is coupled with an alkaline solution of 55 parts of 2 - [4' - (5'' - hydroxynaphthyl - [2''] - aminophenyl)] - 6 - methylbenzthiazole - X:7'' - disulfonic acid which has been obtained by dissolving in 300 parts of water with 11 parts by volume of 30 per cent. sodium hydroxide solution and with the addition of 100 parts by volume of 20 per cent. calcium hydroxide. After several hours stirring, the monoazo dyestuff formed is separated by rendering the coupling mixture acid to Congo by addition of hydrochloric acid and heating to 50° C. The dye acid of the formula

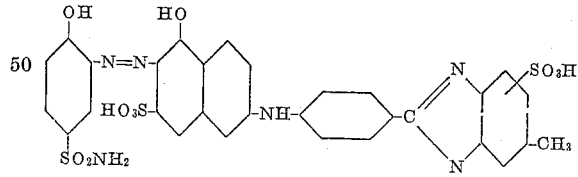

is filtered off at this temperature and converted into the Cu-complex in the following manner:

It is dissolved at 90° C. in 15 times the quantity of water with addition of 40 parts by volume of 25 per cent. ammonia solution. Then a mixture of 100 parts by volume of a 25 per cent. copper sulfate solution and 100 parts by volume of a 25 per cent. ammonia solution is added and the whole maintained with stirring for one hour at 90-95° C. The complex copper compound may be separated by salting out. It forms a dark powder with a bronze lustre, which dissolves in water with a violet color and dyes cotton in red-violet shades which are fast to light.

The 2 - [4' - (5'' - hydroxynaphthyl - [2'']-aminophenyl)] - 6 - methyl - benzthiazole-X:7''-disulfonic acid employed as starting material in this example, can be produced as follows:

24.0 parts of 1:6-dihydroxynaphthalene-3-sulfonic acid are suspended in 500 parts of commercial sodium bisulfite solution. At 95° C., 46 parts of 2 - (4' - aminophenyl) - 6 - methyl - benzthiazole-X-sulfonic acid are introduced and the reaction mixture is maintained for 60 hours with stirring and reflux cooling at 95-97° C. After cooling, the condensation product which is difficulty soluble in acid solution, is filtered off. For purification the filter residue is dissolved in the hot in a medium alkaline with sodium carbonate and freed from any insoluble residue by filtration. By addition of dilute hydrochloric acid the condensation product is precipitated as an orange-brown deposit. If desired the condensation product can be freed from sulfurous acid by heating the suspension.

*Example 2*

15.3 parts of 1 - amino - 4 - hydroxybenzene-3-carboxylic acid are mixed with 15 parts by volume of 30 per cent. sodium hydroxide solution and a concentrated aqueous solution of 6.9 parts of sodium nitrite, cooled to 0° C. by addition of ice and into this mixture 30 parts by volume of 30 per cent. hydrochloric acid rapidly introduced. After 15 minutes the diazo suspension is rendered neutral to Congo by sprinkling in sodium bicarbonate and a solution of 15.3 parts of 1-amino-2:5-dimethoxybenzene, dissolved in 150 parts of water with the addition of 12 parts by volume of 30 per cent. hydrochloric acid is added at 0° C. By further addition of sodium bicarbonate in the course of the coupling reaction, the mixture is maintained neutral to Congo. After 12 hours stirring the whole is heated, rendered weakly acid to Congo with hydrochloric acid and the amino-monoazo dyestuff filtered off. For further diazotization it is dissolved in 300 parts of water with addition of 30 parts by volume of 25 per cent. ammonia solution, mixed with a solution of 7 parts of sodium nitrite in 50 parts of water and diazotized by being run into dilute hydrochloric acid at 0-5° C. After two hours the difficulty soluble diazo compound obtained is filtered off and coupled with a solution of 55 parts of 2 - [4' - (5'' - hydroxynaphthyl - [2''] - aminophenyl)] - 6 - methylbenzthiazole - X:7'' - disulfonic acid which has been prepared in 300 parts of water with addition of 30 parts of sodium carbonate. After stirring for several hours the new diazo dyestuff of the formula

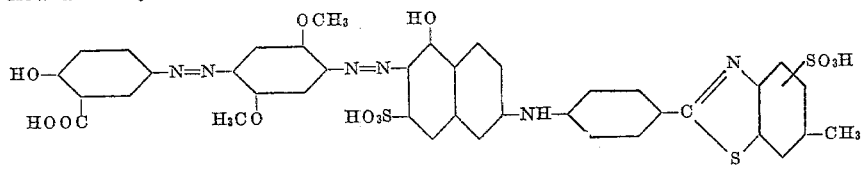

is separated by addition of 100 grams of sodium chloride per liter of coupling liquid and filtered off. It forms a dark powder which dissolves in water with a blue color and dyes cotton according to the single-bath or two-bath after-coppering process in greenish-blue shades of good fastness to light.

*Example 3*

18.4 parts of 4:4'-diaminodiphenyl are tetrazotized in known manner and the clear tetrazo-solution is coupled with a solution of 15 parts of 1-hydroxybenzene-2-carboxylic acid and 40 parts of sodium carbonate in 300 parts of water at 10-15° C. After one hour the yellow-brown suspension of the intermediate compound produced is allowed to flow into a solution of 55 parts of 2 - [4' - (8'' - hydroxynaphthyl - [2''] - aminophenyl)] - 6 - methylbenzthiazole - X:6'' - disulfonic acid and 20 parts of sodium carbonate in 300 parts of water and the whole is stirred for several hours at 10-15° C. Then the coupling mixture is heated to 70° C. and the new disazo-dyestuff of the formula

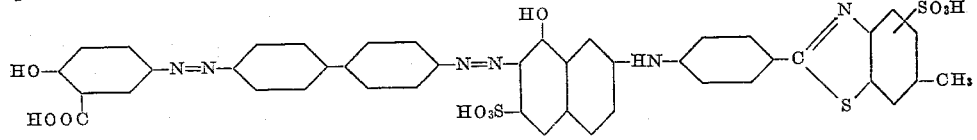

separated by addition of 120 grams of sodium chloride per liter of coupling mixture. When filtered off and dried it forms a dark powder which dissolves in water with a dark brown color and dyes cellulosic fibers in fast, black-brown shades. By after-treatment of the dyeings with agents providing copper the fastness to washing and light are still further improved.

The 2 - [4' - (8'' - hydroxynaphthyl - [2'']-aminophenyl)] - 6 - methylbenzthiazole - X:6''-disulfonic acid can be prepared according to the method described in the last paragraph of Example 1 from 1:7-dihydroxynaphthalene-3-sulfonic acid and 2-(4'-aminophenyl)-6-methyl-benzthiazole-X-sulfonic acid.

If in this example 2 - [3' - (8'' - hydroxynaphthyl - [2''] - aminophenyl)] - benzthiazole - X-6''-disulfonic acid is used instead of 2-[4'-(8''-hydroxynaphthyl - [2''] - aminophenyl)] - 6-methyl - benzthiazole - X:6'' - disulfonic acid, a dyestuff with similar properties is obtained which dyes cellulose fibers in brown tints.

*Example 4*

32.3 parts of the sodium salt of 4-amino-4'-hydroxy - 1:1' - azobenzene - 3' - carboxylic acid are dissolved in 300 parts by volume of hot water, mixed with a solution of 6.9 parts of sodium nitrite in 50 parts of water and added to a mixture of 150 parts of water, 35 parts by volume of 30 per cent. hydrochloric acid and ice. The temperature should be 20-25° C. After stirring for about one hour the diazo-compound obtained is allowed to flow into a solution which contains in 300 parts of water 55 parts of 2-[4'-(8''-hydroxynaphthyl - [2''] - aminophenyl)] - 6 - methyl-benzthiazole-X:6''-disulfonic acid and 30 parts of sodium carbonate in solution. After several hours stirring the disazo dyestuff formed is separated with sodium chloride and filtered off. When dyed by the single-bath or two-bath after-coppering process it gives on cotton fast black-brown shades.

If in this example 2-[3'-(8''-hydroxynaphthyl-[2''] - aminophenyl)] - benzthiazole - X - 6''-disulfonic acid is used instead of 2-[4'-(8''-hydroxynaphthyl - [2''] - aminophenyl)] - 6-methyl - benzthiazole - X:6'' - disulfonic acid, a dyestuff with similar properties is obtained which, by the single or two-bath after-coppering process dyes cellulose fibers violetish brown tints.

Example 5

30.1 parts of 4 - amino - 4' - hydroxy - 1:1'-azobenzene-3:3'-dicarboxylic acid are dissolved in 100 parts of warm water with the addition of 12.5 parts by volume of 30 per cent. sodium hydroxide solution. After addition of a solution of 6.9 parts of sodium nitrite in 50 parts of water the whole is added to a mixture of 35 parts by volume of 30 per cent. hydrochloric acid and 150 parts of water. By addition of ice the temperature is maintained at about 10° C. The diazo compound thus obtained is coupled with a solution alkaline with sodium carbonate of 36.2 parts of 2 - [4' - (8'' - hydroxynaphthyl - [2'']-aminophenyl)] - 6 - methyl - benzthiazole - 6''-sulfonic acid (obtainable by the method given in the last paragraph of Example 1 from 1:7-dihydroxynaphthalene - 3 - sulfonic acid and 2-(4'-aminophenyl)-6-methylbenzthiazole), dissolved in 400 parts of water with the addition of 30 parts of sodium carbonate. After several hours stirring the disazo dyestuff of the formula

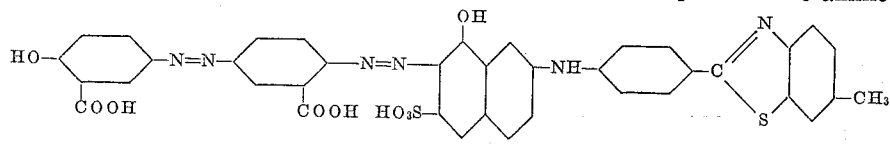

is separated with sodium chloride and filtered off. When dyed by the single-bath or two-bath after-coppering process it gives on cellulosic fiber fast dark brown shades.

Example 6

18.2 parts of 5-nitro-2-aminobenzoic acid are diazotized in the known manner. Meanwhile 55 parts of 2-[4'-(8''-hydroxynaphthyl-[2'']-amino phenyl)]-6-methyl-benzthiazole-X:6''-disulfonic acid are dissolved in 200 parts of water with the addition of 50 parts of a 30 per cent. ammonium hydroxide solution and then at 0° C. the diazotized 5-nitro-2-aminobenzoic acid is added to this solution with stirring.

After 4 hours stirring the volume of the coupling solution is made up to 4000 parts and it is heated to 60° C., 8 parts of grape sugar and 35 parts of a 30 per cent. sodium hydroxide solution added and the whole stirred for 30 minutes at 60° C. 400 parts of sodium chloride are now added to the solution for precipitation of the new dyestuff formed and after stirring for two hours it is filtered. For purification the filter residue is again dissolved in and precipitated from 3000 parts of hot water, again filtered and dried. The new dyestuff of the formula

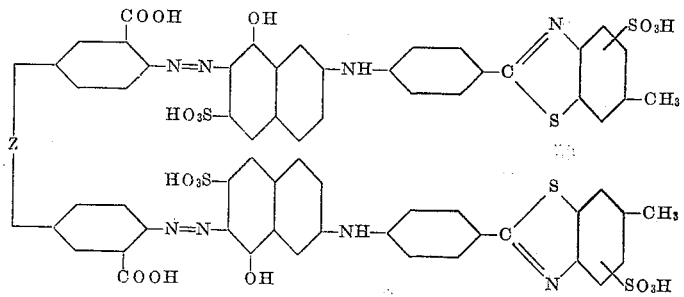

wherein Z represents an azo or azoxy group, forms a dark powder which dissolves in water with a blue-grey color and dyes cotton or fibers of regenerated cellulose by the single-bath or two-bath after-coppering process in fast grey shades.

The dyestuff can also, by heating to about 80° C. for 30 minutes in an ammoniacal copper sulfate solution, be converted into the complex copper compound which dyes cellulosic fibers likewise in fast grey shades.

Example 7

The process is conducted in accordance with the directions of the first paragraph of Example 6. When the monoazo coupling is complete after several hours stirring, the coupling mixture is heated to 50° C. without dilution and there is added with stirring a concentrated aqueous solution of 42 parts of crystalline sodium sulfide. Owing to the reaction the temperature rises to 58° C. Heating for a further hour is carried out at 75° C. and then the whole is carefully acidified with hydrochloric acid and filtered. The aminoazo dyestuff formed is freed from sulfur residues by dissolving to a dilute aqueous solution in the presence of weak alkali and separated with sodium chloride, filtered off and dried. 14.1 parts of the aminoazo dyestuff thus produced are dissolved in 2000 parts of water together with 6.4 parts of the sodium salt of 4-amino-4'-hydroxy-1:1'-azobenzene - 3' - carboxylic acid, to the solution 20 parts of sodium carbonate added and phosgene introduced at 30–35° C. with stirring until no free amino group can any longer be detected. The unsymmetrical urea formed is filtered off, dissolved in aqueous solution alkaline with sodium carbonate and precipitated by means of sodium chloride in the form of the sodium salt. The new dyestuff forms a dark powder which dissolves in water with an olive color and dyes cotton by the single-bath or two-bath after-coppering process in brown-olive shades of good fastness to washing and light.

Example 8

16.8 parts of 5-nitro-2-amino-1-methoxybenzene are diazotized in the customary manner and the diazo compound coupled at 0° C. with a solution which has been prepared from 55 parts of 2-[4'-(8''-hydroxynaphthyl - [2''] - aminophenyl)]-6-methylbenzthiazole-X:6'' - disulfonic acid, 11 parts by volume of 30 per cent. sodium hydroxide solution, 30 parts of anhydrous sodium carbonate and 300 parts of water. After stirring for several hours the coupling is complete. The monoazo dyestuff formed is separated from the coupling mixture by addition of sodium chloride and filtered.

It is now dissolved again in 2000 parts of water with the addition of 95 parts by volume of 30 per cent. sodium hydroxide solution, the whole heated to 70° C. and reduced by the addition of 10 parts of grape sugar with stirring for 30 minutes at 70° C. After the addition of sodium chloride the new azo- or azoxy-dyestuff separates and is filtered.

For conversion into the copper complex the filter cake is dissolved in 1600 parts of water at 95° C., and aqueous solution of tetramine cuprisulfate added corresponding to 50 parts of crystalline copper sulfate and the whole heated with stirring and reflux cooling for 5 hours to 90–95° C. The so obtained complex copper compound of the dyestuff which corresponds to the formula

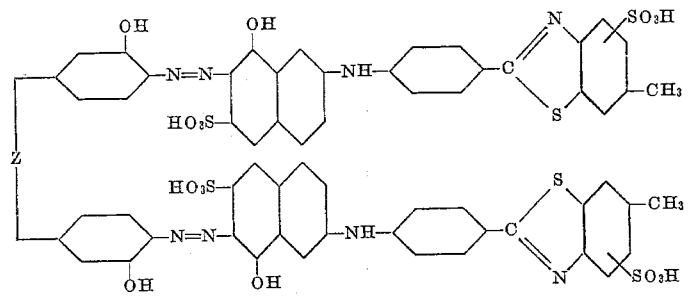

in which Z represents an azo or azoxy group, is separated by addition of sodium chloride, filtered off and in known manner converted into a sodium salt. In this form it constitutes a dark powder which dissolves in water with a grey color and dyes cotton in fast neutral grey shades.

A similar dyestuff is obtained when the process is conducted in such a manner that the monoazo dyestuff obtained according to paragraph 1 is first converted by demethylating coppering into the copper complex compound and from this the polyazo dyestuff produced by reduction with grape sugar.

Example 9

64.2 parts of the aminoazo dyestuff which is obtained when diazotized 1-amino-8-(4'-chlorobenzenesulfonyloxy)-naphthalene-3:6-disulfonic acid is coupled in weak acid medium with 1-amino-2-methoxy-5-methylbenzene, are further diazotized and coupled in solution alkaline with sodium carbonate with 55 parts of 2-[4'-(5''-hydroxynaphthyl-[2'']-aminophenyl)]-6-methylbenzthiazole-X:7''-disulfonic acid. After 4 hours stirring the volume is made up to 1600 parts and the whole is heated to 75° C., 80 parts by volume of a 30 per cent. sodium hydroxide solution added and stirring effected for 45 minutes at 78–80° C. for splitting off of the 4-chlorobenzene sulfonic acid residue.

By addition of sodium chloride and neutralization of the excess of alkali with hydrochloric acid almost to the point of neutrality, the new disazo-dyestuff of the formula is separated. When filtered and dried it forms a black powder which dissolves with a blue color and dyes cotton in fast blue shades.

By using instead of the 2-[4'-(5''-hydroxynaphthyl-[2'']-aminophenyl)]-6-methylbenzthiazole-X:7''-disulfonic acid the 2-[4'-(8''-hydroxynaphthyl-[2'']-aminophenyl)]-6-methylbenzthiazole-X:7''-disulfonic acid, a blue-grey dyeing dyestuff of similar properties is obtained.

Example 10

Into a dyebath consisting of 4000 parts of water, 2 parts of anhydrous sodium carbonate and 2 parts of the dyestuff obtainable according to Example 3, 100 parts of cotton are entered at 50° C., the temperature is raised in the course of 20 minutes to 90–95° C., 30 parts of crystalline sodium sulfate are added and dyeing is carried out for 30 minutes at 90–100° C. Thereupon cooling is effected to about 70° C. and the process is subsequently conducted in accordance with (a), (b) or (c).

(a) The dyeing is rinsed with cold water and treated in a bath which contains 4000 parts of water, 3 parts of crystalline copper sulfate and 3 parts of acetic acid, for ½ hour at 60–70° C. Thereupon it is rinsed and dried. A full yellowish dark brown dyeing is obtained of good fastness to light and washing.

(b) 1.5 parts of complex copper sodium tartrate of practically neutral reaction are added to the dyebath cooled to about 70° C., coppering is carried out for ½ hour at about 80° C. and the dyeing is rinsed with cold water. If desired the dyeing may be soaped by after-treatment for ½ hour in a bath containing 5 grams of Marseilles soap and 2 grams of anhydrous sodium carbonate per liter of water. A full yellowish dark brown dyeing of good fastness to washing and light is obtained.

(c) The dyeing is rinsed with cold water and then after-treated for ½ hour at 20° C. in a solution prepared by dissolving 4.5 parts of the water-soluble condensation product from dicyandiamidine and formaldehyde, 1.5 parts of copper acetate and 6 parts of concentrated aqueous ammonia solution in 3000 parts of water and the addition of 2 parts of anhydrous sodium carbonate to the solution containing tetrammine copper-II-acetate. It is thereup rinsed and dried. A full yellowish dark brown dyeing is obtained

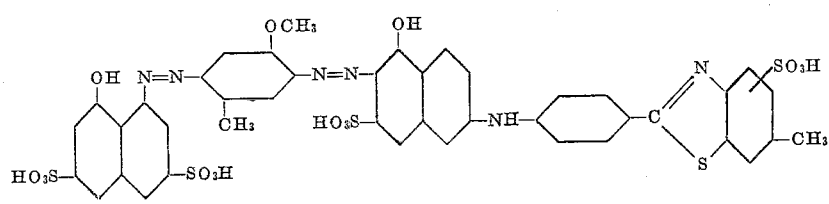

which is distinguished by very good fastness to light and good wet fastness properties.
What I claim is:
The azo dyestuff of the formula
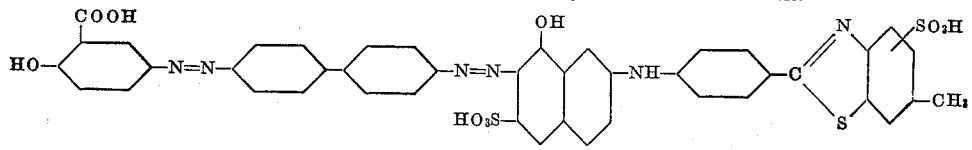
References Cited in the file of this patent
UNITED STATES PATENTS
| Number | Name | Date |
| --- | --- | --- |
| 1,052,136 | Desamari et al. | Feb. 4, 1913 |
| 1,667,327 | Mayer et al. | Apr. 24, 1928 |
| 2,283,823 | Sieglitz et al. | May 19, 1942 |
| 2,536,957 | Riat et al. | Jan. 2, 1951 |